United States Patent
Gupta et al.

(10) Patent No.: US 10,503,923 B1
(45) Date of Patent: Dec. 10, 2019

(54) CENTRALIZED DATA STORE FOR MULTIPLE DATA PROCESSING ENVIRONMENTS

(71) Applicant: Amazon Technologies, Inc., Seattle, WA (US)

(72) Inventors: Anurag Windlass Gupta, Atherton, CA (US); Andrew Edward Caldwell, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 359 days.

(21) Appl. No.: 15/253,690

(22) Filed: Aug. 31, 2016

(51) Int. Cl.
*G06F 17/30* (2006.01)
*G06F 21/62* (2013.01)
*G06F 21/60* (2013.01)

(52) U.S. Cl.
CPC ........ *G06F 21/6227* (2013.01); *G06F 21/604* (2013.01)

(58) Field of Classification Search
None
See application file for complete search history.

(56) References Cited

U.S. PATENT DOCUMENTS

| | | | | |
|---|---|---|---|---|
| 7,650,514 B2* | 1/2010 | Howell | ................. | G06F 9/526 713/100 |
| 8,108,427 B2* | 1/2012 | Prahlad | ................. | G06F 21/6218 707/785 |
| 8,447,728 B2* | 5/2013 | Prahlad | ................. | G06F 21/6218 707/627 |
| 8,655,917 B2* | 2/2014 | Olivieri | ................. | G06F 17/30902 707/705 |
| 8,732,213 B2 | 5/2014 | Sowell et al. | | |
| 8,806,578 B2* | 8/2014 | Ivanov | ................. | G06F 21/6218 726/4 |
| 9,081,975 B2 | 7/2015 | Ducott, III et al. | | |
| 9,323,664 B2* | 4/2016 | Yu | ................. | G06F 12/0246 |
| 9,424,140 B1* | 8/2016 | Madhavarapu | ..... | G06F 11/1464 |
| 9,613,068 B2 | 4/2017 | Tsirogiannis et al. | | |
| 9,858,433 B2* | 1/2018 | Hammoutene | ..... | G06F 21/6245 |
| 2012/0265744 A1* | 10/2012 | Berkowitz | ............. | G06Q 30/06 707/705 |
| 2014/0214895 A1* | 7/2014 | Higgins | .............. | G06F 16/3325 707/770 |
| 2015/0356123 A1 | 12/2015 | Gorelik | | |

* cited by examiner

*Primary Examiner* — Debbie M Le
(74) *Attorney, Agent, or Firm* — Robert C. Kowert; Meyertons, Hood, Kivlin, Kowert & Goetzel, P.C.

(57) ABSTRACT

A centralized data store may provide multiple processing environments access to data. Different data processing clients may determine structural data for a data set stored in a remote data store. An access coordination scheme may be implemented to grant permission to the different processing clients to perform various operations with respect to the portions of the data set. The data processing clients may then access the data set according to the structural data so that operations may be performed with respect to the data permitted by the access coordination scheme to the data processing clients.

20 Claims, 9 Drawing Sheets

CENTRALIZED DATA STORE FOR MULTIPLE DATA PROCESSING ENVIRONMENTS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies to process large amounts of various types of data may be implemented to efficiently query the different types of data. For example, some data processing techniques are optimal for processing large amounts of unstructured or semi-structured data, whereas other data processing techniques provide a variety of options for searching and updating structured data.

Because numerous types of processing environments for data exist, the ability to utilize multiple different processing environments is highly desirable. Moreover, a common storage location for data that is accessible to the multiple types of processing environments offers users incentives to choose the best processing environment for a particular task, rather than attempting to find a processing environment that works in all scenarios. Providing flexible deployment of processing environments increases data processing performance and lowers resource costs.

Figure 1:
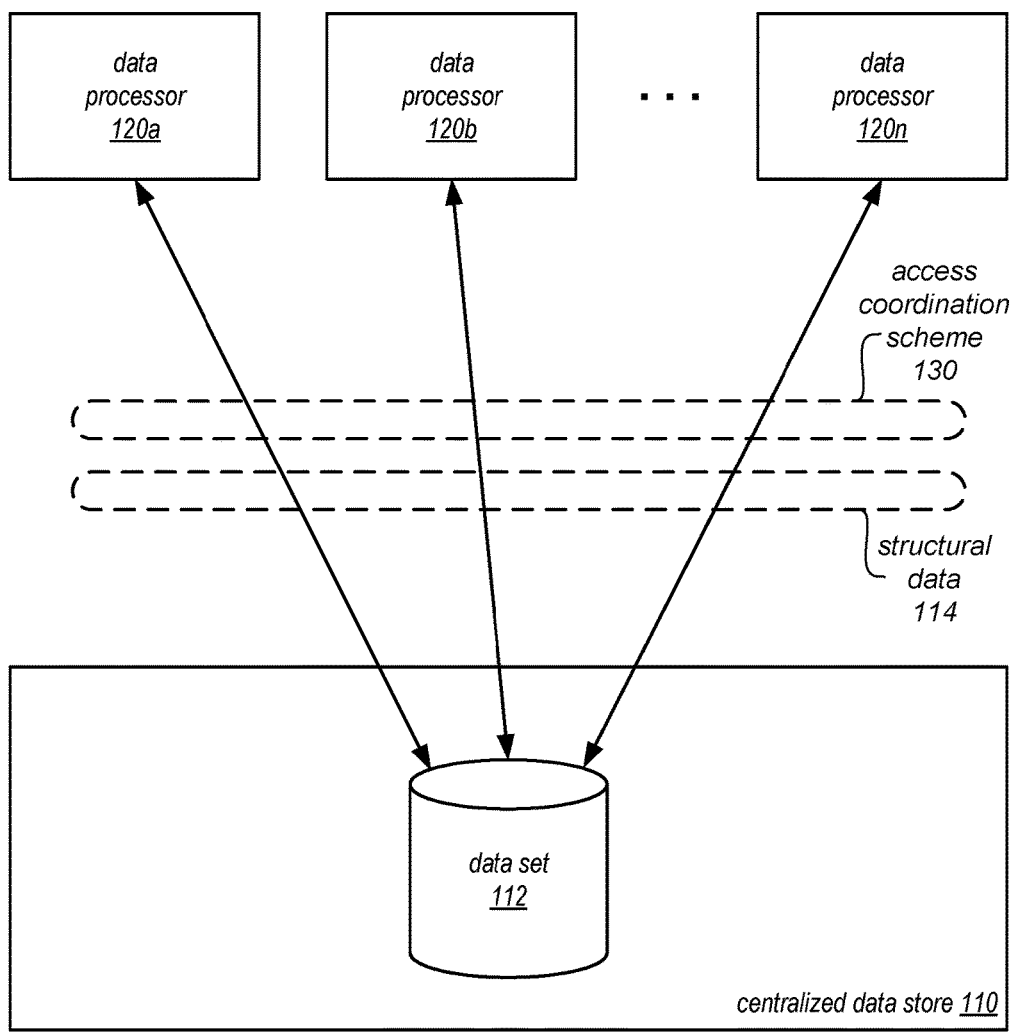
FIG. 1 illustrates a logical block diagram of a centralized data store for multiple data processing environments, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of a centralized data store for multiple data processing environments are described herein. Different processing environments offer users different features or capabilities when performing operations on data. Some processing environments, for instance, may be optimized for performing analysis over large ranges of data (e.g., columnar data stores which provide for fast query processing over ranges of column data), while other processing environments may be better suited for processing large numbers of operations with low-latency (e.g., some forms of non-relational data stores). In order to leverage the power of these different processing environments, the data is typically uploaded, transferred, or stored in the processing environment or in a format particular to the processing environment, effectively (or actually) giving that processing environment an exclusive right to the data for processing or creating a new or different version of the data. Some data sets may benefit from analysis in a wide variety of processing environments. For example, a relational database processing environment offers certain transactional capabilities that are optimal for updating data, while another processing environment, such as a map reduce processing environment, may offer better capabilities for performing an analysis over the data as a whole (e.g., if the set of data is very large or unstructured). In order to provide access to multiple different processing environments, a centralized data store that stores data so that the data is accessible to multiple processing environments may be implemented, in various embodiments.

A centralized data store (which may be sometimes referred to as a data lake) may be implemented to store a variety of types of data or data sets. For example data sets may have different file types or data formats and may be structured (e.g., relational table structure), semi-structured (e.g., key value-item pairs), or unstructured (e.g., a collection of different files). Because the types of data stored in the centralized data store may be varied, structural data describing the data set may be determined and maintained for the data set in order to access the data set in a centralized data store. Consider a data set maintained a file that delimits individual information (e.g., fields) within a file using tab characters. The structural data describing the data set may indicate that the tab values are the delimiters for fields in the file so that when a processing environment is accessing the file, the tab characters may be interpreted as delimiters and not content (e.g., when searching for particular fields).

As multiple processing environments may access a same data set stored in a centralized data store, a coordination scheme may be implemented to prevent conflicting access while allowing multiple processing environments to access the same data set. An individual portion of the data set, for instance, may be checked out, leased, or locked for the use of one processing environment according to an access coordination scheme, while another portion of the data set may be may be checked out, leased, or locked for the use of a different processing environment according to the access coordination scheme. Alternatively, an access coordination scheme may determine access permissions by checking for access conflicts after operations are submitted or performed, without conflicting access operations excluded, denied, blocked, or rolled-back. In this way, multiple processing environments may process the same portion of a data set at the same time.

Figure 2:
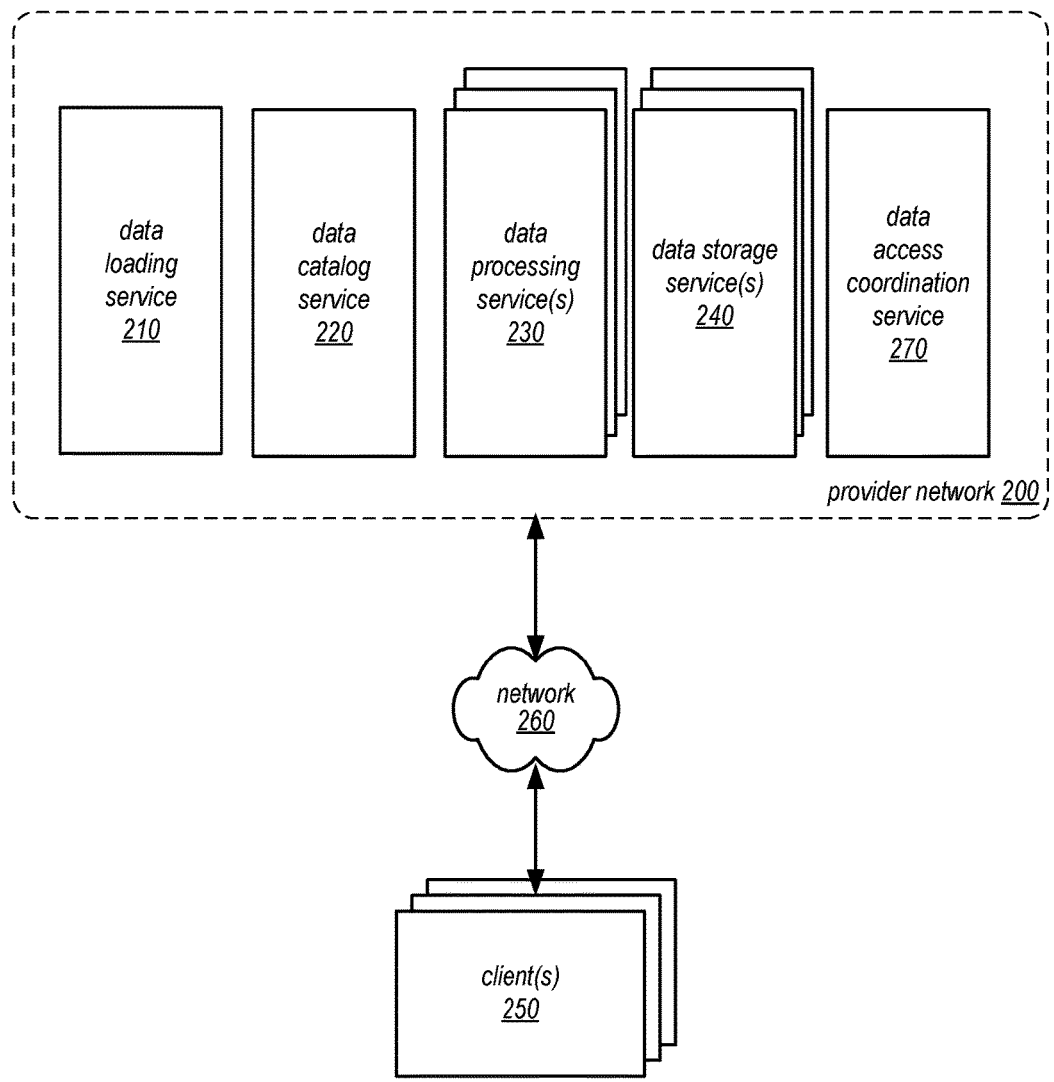
FIG. 2 is a logical block diagram illustrating a provider network offering a data storage service serving as a centralized data store for multiple data processing services, according to some embodiments.

FIG. 1 illustrates a logical block diagram of a centralized data store for multiple data processing environments, according to some embodiments. Centralized data store 110 may store data sets (e.g., data set 112) that are accessible to multiple different data processors, data processors 120a, 120b, and 120n, via structural data 114 as permitted by access coordination scheme 130. Centralized data store 110 may be any type of data store that receives data of varying data types and stores the data for subsequent access. Data may be grouped or stored together in collections (e.g., logically or physically) that are accessible as a group or individually. For instance, log files describing different time periods may be stored in a group of log files. Centralized data store 110 may be a network-based data store offering access to data, such as data set 112, via network-based communications from data processors 120a (e.g., according to network communications formatted according to an application programming interface (API) or storage protocol). FIG. 2, discussed below, provides various examples of centralized data store (e.g., an object-based storage service).

Data processors 120 may utilize employ different (or the same) data processing environments to process portions or all of data set 112. Different data processors 120 may offer different query processing capabilities (e.g., different functions, operators, or other commands), the same query processing capabilities (e.g., select statements or joins—which may be implemented differently), and/or some combination of the same or different query processing capabilities. Because data processors 120 may be implemented as different processing environments, user interaction with data processors 120 may be different. For example, data processor 120a may receive requests to perform operations via a standardized programmatic interface, such as structured query language (SQL) interface like java database connectivity (JDBC) or open database connectivity (ODBC), while data processor 120b may allow users to execute scripts that run user-defined processing operations or functions. The differences between data processors 120 allow users with preferences for one of the multiple data processing environments available (e.g., due to greater familiarity with the one data processing environment or because of a particular capability that the one data processing environment offers) to access data set 112 without having to utilize another one of the data processing environments. Moreover, because some data processing environments are better suited to some operations than others, a user could employ data processor 120a to perform operations to accomplish one task on data set 112, while the user (or a different user) could employ data processor 120b to accomplish a different task on data set 112, leveraging the different capabilities of data processor 120b. Note that although data processors 120 are illustrated as a single component, data processors 120 may be implemented as a group/cluster of nodes, systems or devices to access data set 112 (e.g., a data warehouse cluster or a map reduce cluster).

In order for different data processors 120 to access and operate upon data set 112, structural data 114 may be determined for data set 112 and obtained by data processors 120. For example, data processors 120 may implement some kind of recognition system or technique to evaluate data set 112 to determine structural data 114. File signatures, pattern analysis, delimiter recognition, and various other techniques discussed below may be implemented by data processors 120. However, in at least some embodiments, structural data 114 may be determined and provided to data processors. A data catalog or other data structure, repository, or location storing structural data 114 for data set 112 may be accessible to data processors 120, for instance, such as a data catalog service as discussed below with regard to FIGS. 2, 3, and 5. In this way, data processors 120 may quickly begin to process data set 112 (as permitted by access coordination scheme 130) via the structural data that is obtained.

In order to determine which data processors 120 may access data set 112 (or a portion of data set 112) or how data processors 120 may access data set 112 (or a portion of data set 112), access coordination scheme 130 may be implemented. Access coordination scheme 130 may determine permissions for accessing data set 112. Permissions may be granted or determined prior to any access of data set 112 or after accessing data set 112 (but before permanently committing changes to data set 112). For example, different data processors 120 may be granted different permissions, such as write permission and read permission granted for the same portion of data set as discussed below with regard to FIG. 6. In some embodiments, access coordination scheme 130 may provide fine grained access control so that different data processors 120 may access different portions of data set 112 (e.g., data processor 120a may be granted permission to upload a new partition or other data object to include in data set 112 while data processor 120n may be granted permission to perform analysis on other data partitions or objects). Access coordination scheme 130 may be implemented in many ways. A distributed lock manager may, for instance, be implemented to maintain locks on different portions of data set 112 so data processors 120 may obtain rights to access a portion of a data by obtaining the corresponding lock for the portion of data. In some embodiments, a leasing scheme, as discussed below with regard to FIGS. 2, 4, and 5, may be implemented so that different data processors 120 may access the same or different portions of data set 112 (or the entire data set 112) with varying (or the same) access permissions (e.g., read/write, read-only, write-only, etc.). Access coordination scheme 130 may also determine access permissions by allowing data processors that are first to access or complete operations with respect to data set 112, while denying those data processors permission to complete operations that conflict with previously performed or submitted operations.

Please note that the previous description of centralized data store for multiple data processing environments is a logical illustration and thus is not to be construed as limiting as to the implementation of a data store, access coordination scheme, structural data, or data processors.

This specification begins with a general description of a provider network that implements a data storage service as a centralized data store for other data processing services that provide many different data processing environments for processing data stored in the centralized data store. Then various examples of a data storage service, data catalog service, and data access coordination service including different components/modules, or arrangements of components/module that may be employed as part of implementing the services are discussed. A number of different methods and techniques to implement a centralized data store for multiple data processing environments are then discussed, some of which are illustrated in accompanying flowcharts. Finally, a description of an example computing system upon which the various components, modules, systems, devices, and/or nodes may be implemented is provided. Various examples are provided throughout the specification.

FIG. 2 is a logical block diagram illustrating a provider network offering a data storage service serving as a centralized data store for multiple data processing services, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as a virtual compute service, data loader service 210, data catalog service 220, data processing service(s) 230, (e.g., relational or non-relational (NoSQL) database query engines, map reduce processing, data flow processing, and/or other large scale data processing techniques), data storage service(s) 240 (e.g., an object storage service, block-based storage service, or data storage service that may store different types of data for centralized access multiple data processing service(s) 230, as well as other data storage services (e.g., database services, such as a data warehouse) which may in turn rely upon a data storage service acting as a centralized data store), data access coordination service 270 (e.g., implementing an access control scheme for data processing service(s) 230 to gain permission to access data sets stored in data storage service 240), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data loading service 210 may provide extraction, transformation, and loading capabilities to place data into data sets at one or more of the various data storage service(s) 240. For example, data loading service 210 may provide clients with the resources to create, maintain, and orchestrate data loading jobs that take one or more data sets, perform various transformation operations, and store the transformed data for further processing (e.g., by one or more of data processing service(s) 230).

Data catalog service 220 may provide a catalog service that ingests, locates, and identifies data stored on behalf of clients in provider network 200 in data storage service 240, as discussed in detail below with regard to FIG. 3. For example, a data set stored in a non-relational format may be identified along with container or group in an object-based data store that stores the data set along with other data objects on behalf of a same customer or client of provider network 200. In at least some embodiments, data catalog service 220 may direct the transformation of data ingested in one data format into another data format. For example, data may be ingested into data storage service 240 as single file or semi-structured set of data (e.g., JavaScript Object Notation (JSON)). Data catalog service 220 may be configured to identify the data format of the single file or semi-structured set of data and direct the creation of a table stored in storage slabs mapped to a tree as discussed above. In at least some embodiments, the data stored in another data format may be converted to a different data format as part of a background operation (e.g., to discover the data type, column types, names, delimiters of fields, and/or any other information to construct the table of semi-structured data in order to create a structured version of the data set).

Data processing services 230 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 240 (e.g., query engines processing requests for specified data). Data processing service(s) 230 may be clients of data catalog service 220 and data access coordination service 270 in order to obtain structural information and a lease for performing various processing operations with respect to data sets stored in data storage service(s) 240, as discussed below with regard to FIG. 5.

Data storage service(s) 240 may implement different types of data stores for storing, accessing, and managing data on behalf of clients 250 as a network-based service that enables clients 250 to operate a data storage system in a cloud or network computing environment. For example, data storage service(s) 240 may include various types of database storage services (both relational and non-relational) for storing, querying, and updating data. Such services may be enterprise-class database systems that are highly scalable and extensible. Queries may be directed to a database in data storage service(s) 240 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 240 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 240 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Similar to data processing service(s) 230, in some embodiments, data storage service(s) 240 may perform queries or updates to data stored in a centralized data store. For example, a query engine implemented as part of one data storage service 240 may obtain structural information from data catalog service 220 and a lease for performing various processing operations with respect to data sets 270 stored in a centralized data store, as discussed below with regard to FIG. 5, in order to access and process requests with respect to the data set (e.g., a relational database engine of a relational database service may access data objects maintained in an object data store by relying upon a table scheme determined of the data objects and maintained as part of structural data for the data objects in data catalog service 220 with read-only permission granted by a read-only lease obtained from data access coordination service 270).

In at least some embodiments, one of data storage service (s) 240 may be a data warehouse service that utilizes a centralized data store implemented as part of another data storage service 240. A data warehouse service as discussed below may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a sort order may be generated and applied so that entries in the database table are stored according to the sort order. When queries are received, mapping information, such as may be maintained in a superblock as discussed below may be utilized to locate the data values likely stored in data blocks of the columnar relational database table, which may be used to determine data blocks that do not need to be read when responding to a query.

A data storage service 240, such as the data warehouse service example given above, may implement storage clusters to respond to store requests (e.g., to write data into storage) or queries for data (e.g., such as a Server Query Language request (SQL) for particular data), along with many other data management or storage services. Multiple users or clients may access a storage cluster to obtain data storage services, which in turn may access a data set stored in another data storage service (e.g., an object data storage service that provides access to multiple different data processors, as discussed above with regard to FIG. 1 and FIGS. 4-8 below. In at least some embodiments, a data storage service may provide network endpoints to the storage clusters which allow the clients to send requests and other messages directly to a particular cluster. As noted above, network endpoints, for example may be a particular network address, such as a URL, which points to a particular cluster.

For example, a client 250 may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Generally speaking, clients 250 may encompass any type of client configurable to submit network-based requests to provider network 200 via network 260, including requests for storage services (e.g., a request to create, read, write, obtain, or modify data in data storage service(s) 240, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 250 and the operating system or file system on behalf of applications executing within the operating system environment.

Clients 250 may convey network-based services requests (e.g., access requests directed to data in data storage service(s) 240, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
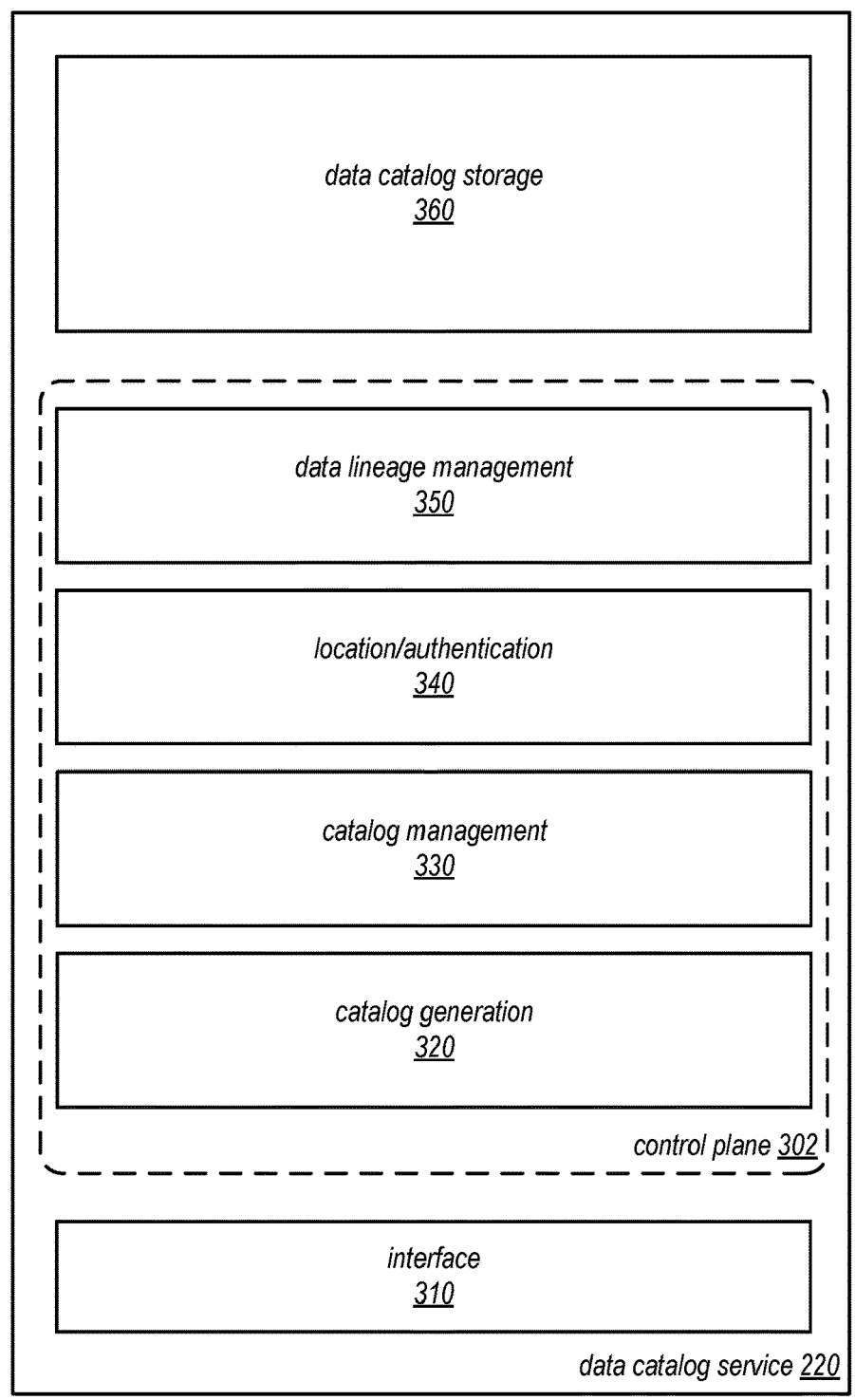
FIG. 3 is a logical block diagram illustrating a data catalog service that dynamically generates data catalogs that provides structural data for accessing data stored in a centralized data store, according to some embodiments.

FIG. 3 is a logical block diagram illustrating a data catalog service that dynamically generates data catalogs that provides structural data for accessing data stored in a centralized data store, according to some embodiments. Data catalog service 220 may maintain data catalogs that are dynamically generated to describe data sets (stored in provider network 200 or in external storage locations) in data catalog storage 360. Management of the data catalog service 220 may be implemented by control plane 302 (including the various illustrated functionalities). Data catalog may provide access to both data catalog storage 360 and control plane 302 via interface 310, which may be a programmatic interface, command line interface, and/or graphical user interface, in various embodiments.

Control plane 302 may implement various features and functionalities to generate, manage, update, and/or otherwise maintain data catalogs. Catalog generation 320 may access data sets at multiple different storage locations to apply structure recognition techniques. The location of data sets may be determined by location/authentication 340. Location/authentication 340 may obtain identification credentials (e.g., username/password) validate them, and perform techniques to locate data sets associated with the supplied credentials. For instance, location/authentication may ping a storage service 240 implementing a centralized data store (or other storage service) to identify whether or not the storage service stores a data set associated with the validated credentials. In some embodiments, location/authentication 340 may receive a set of storage locations from a client and determine network addresses, and other information necessary to access the locations. Location/authentication 340 may provide identified storage locations to catalog generation 320 for evaluation.

Catalog generation 320 may dynamically generate data catalogs for data processors (e.g., data processing services 230 or data storage services 240 not implementing a centralized data store) so that structural information is available when data processors are ready to access a data set in the centralized data store. Catalog generation 320 may be implemented in different ways by accessing data sets identified for a data catalog in order to apply structure recognition techniques to determine structural data. For instance catalog generation 320 may implement crawlers to extract data for the application of structure recognition techniques.

Catalog generation 320 may implement crawl management in order to direct the efforts of crawlers. For instance, crawl management may configure crawlers to extract certain data from data sets that is usable for certain structure recognition techniques (e.g., header data for file metadata, how much data to extract, etc.). Crawl management may obtain the appropriate authentication credentials for crawlers so that crawlers may access identified data sets. Crawl management may assign different data sets to different crawlers to distribute the crawl workload evenly. Crawl management may track the progress of crawlers, restarting or redirecting work to other crawlers in the event of crawler failure or overload. Crawl management may schedule previously crawled data sets for a new crawl (e.g., in order to update the structural data stored in a data catalog dynamically).

Crawlers may be configured to access, scan, extract, or otherwise obtain data from data sets according to the assignments provided by crawl management. Crawlers may utilize the appropriate access credentials to obtain access to data sets(s) and may continue to extract data from a data set until the structural data for the data set is complement. In some embodiments, recognition engine(s) may request particular data (e.g., directly to crawlers or via crawl management) to be extracted. Crawlers provide the extracted data to recognition engine(s) 530 for analysis. Recognition engine(s) implement various structure recognition techniques to determine structural data for data sets. For instance, recognition engines may apply various techniques to recognize delimiters between items in a data set (e.g., commas in a CSV file, tabs, etc.), to determine file type or file format (file recognition techniques) based on data signatures or patterns located within a data set to determine data types (e.g., data type recognition techniques) such as generic data types (e.g., string, integer, floating point, etc.) or custom, special, or user specified data types (e.g., 5 character numbers that are postal codes). Recognition engine(s) 530 may apply multiple different structure recognition techniques to the data extracted from a data set, including recognition techniques uploaded or applied based on data received from a user.

Catalog generation 320 may store structural data determined by recognition engine(s) in data catalog storage 360. For example, different database tables may be created for each data set as part of the data catalog. In some embodiments, tables may be linked to identify related data sets or combined with tables for other data sets.

Control plane 302 may implement catalog management 330 in order to allow for catalog users, owners, or other stakeholders, to modify or otherwise manage data catalogs. For instance, catalog management may allow users to combine, delete, or split tables of structural data in the catalog or edit the structural data determined for a data catalog 7. Catalog management 330 may implement access or control policies for data catalogs (e.g., to limit access to a data catalog to authorized users). Catalog management 330 may implement data retention or life cycle policies to determine how long data catalogs (or older versions of data catalogs as may be described by lineage tracking implemented by data lineage management 350) are maintained in data catalog storage. Catalog management 330 may handle the provisioning of storage resources in data catalog storage 360 for creating new data catalogs (e.g., providing the location of storage resources to catalog generation 320). Catalog management 330 may also perform load balancing, heat management, failure recovery, and other resource management techniques (e.g., implement durability requirements) to ensure the availability of data catalogs for clients.

Data lineage management 350 may be implemented as part of data catalog service 230. Data lineage management 350 may be implemented to track, maintain, or otherwise detect changes to data sets (either to the underlying data or the structure of the data set, resulting in a change to structural data for the data set). Data lineage management 350 may implement change processing functionality to handle change notification(s) sent from data loader(s) or modifier(s) (e.g., data processors). For example, data lineage tracking 350 may implement a programmatic interface via which change notifications may be submitted. Change processing may generate or forward change(s) based on the received change notifications. In some embodiments, change processing may implement a versioning schema (e.g., a tree, log, or other structure for) to describe changes to structural data for a data set or a data set itself over time. For instance, every time a change notification for a data set is received, a change or modification to a version tree for the data set may be determined. The change or modification to the version tree for the data set may be provided to publisher or component that may perform an update to the data catalog to record the modification to the version tree (e.g., by writing to a storage location that maintains the version tree).

Data lineage management 350 may track changes to the structural information (e.g., adding columns, changing data formats or file types, changing data types of a column, etc.). Similarly, data lineage management 350 may track changes to the data of data sets (e.g., the addition of new rows or items, deletion, modification of data, a new partition of a data set being created, etc.). These types of changes may, in various embodiments, trigger notification events detected by event detector or other component that monitors change notifications for various events. For example, event detection may monitor for a file format change event, so that if a new partition or data is added to a data set that has a different file format, interested parties (e.g., data processors with leases to the data set) may be notified. Parties interested in changes to a data set may subscribe or register interest in a data set, in some embodiments. For example, the programmatic interface for data lineage tracking 350 may allow for event subscriber(s) to register for notification for particular events for particular data sets. When the event is detected, data lineage tracking may send an event notification to the registered event subscriber(s). Event notifications may be sent in various formats such as messages formatted according to an API, SMS destination, or email address.

Although the example above discusses a push model for change notifications (from data loaders or data processors), other implementations may allow data lineage tracking 350 to obtain changes. For example, in some embodiments, monitors or observation agents in the centralized data store may be installed or directed to watch for changes applied to data sets. In some embodiments, data storage services storing the data sets may directly provide change notifications to change processing. Crawlers may be implemented to revisit data sets and generate new structural data, obtaining the changes to the structural data and providing notifications of the changes to change processing. Therefore, the previous example of data loaders/data processors providing notifications of changes is not intended to be limiting for tracking changes.

Data catalog storage 360 may be implemented by one or more storage nodes, services, or computing devices (e.g., system 1000 discussed below with regard to FIG. 9) to provide persistent storage for data catalogs generated by data catalog service 200. Such storage nodes (or other storage components of storage 360) may implement various query processing engines or other request handling components to provide access to data catalogs according to requests received via interface 310.

Figure 4:
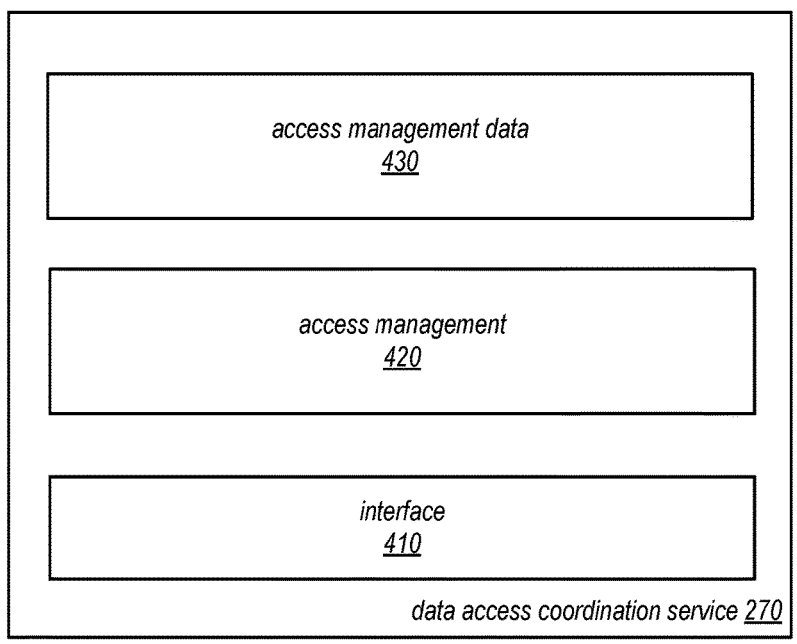
FIG. 4 is a logical block diagram illustrating a data access coordination service that implements an access coordination scheme for multiple data processing services that access data stored in a centralized data store, according to some embodiments.

In order to determine the permissions of different data processors (e.g., data processing service(s) 230 or other data storage service(s) 240 not implementing a centralized data store), an access coordination scheme may be implemented. A centralized access coordination manager or service may be implemented to facilitate different access coordination schemes. FIG. 4 is a logical block diagram illustrating a data access coordination service that implements an access coordination scheme for multiple data processing services that access data stored in a centralized data store, according to some embodiments.

Data access coordination service 270 may implement interface 410 to provide a mechanism for determining access permissions, such as requesting leases or submitting transactions (or individual operations) for conflict checks for data sets or portions of data sets maintained in a centralized data store. For example, interface 410 may be a programmatic interface that allows data processors to send requests for leases for a specified data set (or specified portion(s) of a data set) and the type of permissions to be granted by the lease (e.g., read-only, read-write, write-only, permissions to add additional data but not modify existing data, etc.). In some embodiments, leases may only be valid for a standard period of time (or an amount of time specified in the lease so that shorter times can be specified for write leases while longer times can be specified for read leases). The length of the lease may be specified in a request for a lease (although the requested length may not be granted). Alternatively, data access coordination service may resolve access conflicts by validating proposed transactions or operations that are submitted for performance at a data set. The request may identify current or expected values for portion(s) of the data set and proposed change(s) to the data set. These current or expected values and/or proposed changes may be evaluated with other submitted current or expected values and proposed changes from other data processors to determine whether submitted change(s) conflict with other change(s) that were previously submitted. If a conflict is detected, then data access coordination service 270 may deny permission to the data processor that submitted change(s) that conflict with previously submitted change(s).

Data access coordination service implement access management 420 to adjudicate between permission requests. For instance, access management 420 may implement a strict ordering scheme or deterministic technique for identifying the priority or ordering of lease requests for a data set. In one such embodiment, access management 420 may utilize timestamps or other sequence numbers assigned to requests as they are received to determine the availability of leases for data sets based on the assigned sequence of requests. In some embodiments, access management 420 may evaluate lease requests for with respect to the availability of a lease for the data set. For instance, some data sets may have different lease limitations than other data sets (e.g., a limit on the number of reading leases or writing leases granted may differ between data sets). When a request is received lease coordination may access lease data 430 which maintains a consistent state of leases granted and available for data sets in the centralized data store to determine whether a requested lease may be granted. If, for instance, a write lease for a data set (or a portion of a data set) is already granted, then another request for a write lease for the same data set or portion of the data set may be denied. Note that lease granularity within data sets may allow for co-existing, valid leases of the same type (e.g., read-write leases) for different portions of the same data set. However, some leases may be granted that are exclusive to performing certain operations (e.g., writes) to the entire data set so that a conflict lease request for only a portion of the data set to perform the same operations may be denied. Because lease coordination may be implemented in numerous different ways, the previous discussion is not intended to be limiting, but merely provides an example of one type of access coordination scheme that may be implemented for data sets stored in a centralized data store that are accessible to multiple data processing environments and thus is not intended to be limiting.

Leases may be communicated or represented to data processors as tokens, or other indications, that may be included in communications with the centralized data store. In this way, the centralized data store may verify the validity of a lease prior to allowing the access operation, in some embodiments. For instance, an indicator may be included in a lease token that the centralized data store may be able to evaluate to determine whether the lease for the data processor that submitted the token has expired (e.g., without having to access the data access coordination service 270). In some embodiments, data processors may self-enforce leases so that no operations are performed upon expiration of a granted lease. Note that although not illustrated in FIGS. 2-5, data access coordination service 270 may be implemented as part of a data storage service 240 that implements the centralized data store.

Access management 420 may implement a "forgiveness"-based access coordination scheme that adjudicates between submitted changes to a data set. For example, access management 420 may act as a transaction manager, maintaining information describing current or proposed changes (e.g., transactions) in access management data 430, and denying permission to complete operations for those proposed changes that conflict with currently accepted or ongoing transactions. In this way, data processors may perform the various operations to make changes to a data set (e.g., as part of a transaction) and only have to obtain permission to complete, apply, or commit the transaction when all other work is completed, which may allow for parallel write operations to be performed by different data processors as long as the write operations do not conflict (unlike the exclusive lease access coordination scheme described above which may provide exclusive write access to all or a portion of a data set, consequently blocking other write requests to the data set or portion of the data set even if they do not conflict).

Figure 5:
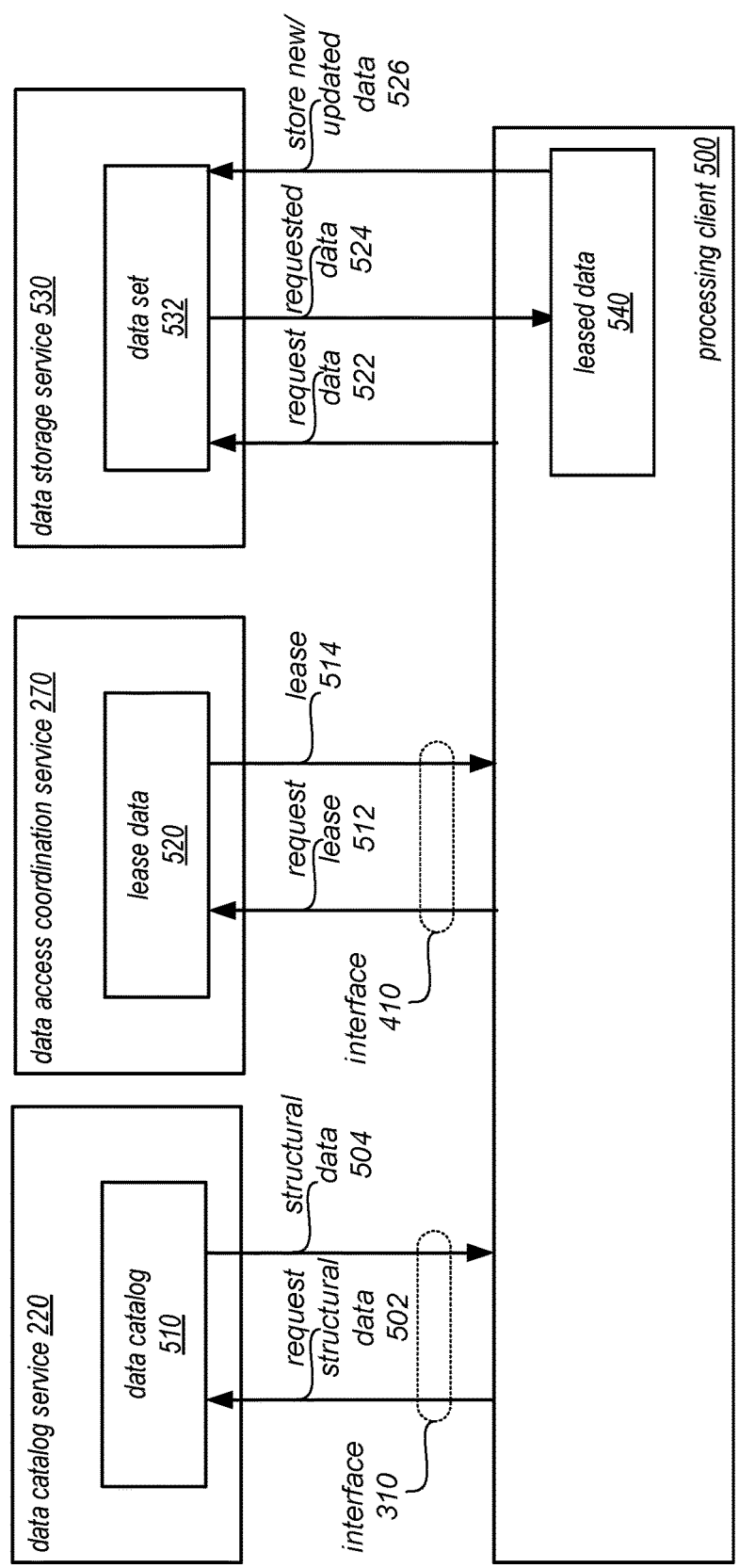
FIG. 5 is a logical block diagram illustrating interactions between a processing client 500 and a data catalog service, a data access coordination service, and a data storage service that provides a centralized data store for multiple data processing environments, according to some embodiments.

FIG. 5 is a logical block diagram illustrating interactions between a processing client 500 and a data catalog service, a data access coordination service, and a data storage service that provides a centralized data store for multiple data processing environments, according to some embodiments. Processing client 500 may be one or more components of a data processing service 230 or data storage service 240 that access data set 532 in a centralized data store of data storage service 530.

Processing client 500 may be a cluster or group of nodes, systems, components, or devices any number of which may perform the illustrated interactions. To obtain structural data for accessing data set 432, processing client may send a request for structural data 502 via interface 310 of data catalog service 220. In response to the request, data catalog service 220 may access the corresponding data catalog 510 for data set 532 and provide the requested structural data 504. Processing client 500 may then request a lease 512 to access one or more portions (or the entirety) of data set 532 via interface 410 of data access coordination service 270. Data access coordination service 270 may determine whether such a lease is available based on lease data 520 corresponding to data set 532 and if so, provide the requested lease 514 to processing client 500.

Processing client 500 may proceed to access data set 532 in data storage service 530 in accordance with the received lease. For example, in some embodiments, processing client may obtain and maintain the leased data 540 for local performance of operations at processing client 500. A request for the leased data 522 may be sent to data storage service 530 which may process the access request and return the requested portion 524 of data set 532 to processing client 500. Note that where the leased portion is a large portion (or the entire portion), processing client 500 may send requests 522 or for an amount of data less than the leased portion. For example, data may be requested 522 upon demand as the data is needed for performing processing operations at processing client 500 (e.g., by requesting a specified block, page, chunk or range of blocks, pages, or chunks of the leased portion of data set 532 to operate upon). In this way, leased data 540 maintained at processing client 500 may take advantage of a tiered storage architecture so that unnecessary data transfers may not consume network bandwidth, or unneeded data consume storage or processing resources at processing client 500. For processing clients that change the leased data, updated data may be stored 526 back to data storage service 530, which may be replaced the changed portions with the portions provided by processing client 500. In some scenarios, processing client 500 may be uploading new or additional data (as allowed by the lease), and so requests to store new data 526 may also be sent.

Note that for alternative access coordination schemes that do not rely upon leases or other excluding mechanisms, the interactions illustrated in FIG. 5 may occur differently. For example, instead of submitting a request for lease 512, processing client 500 may access data storage service, obtain some or all of data set 532, perform changes to the obtained data, submit the changes to data access coordination service, and, if no conflict is detected by data access coordination service 270, receive permission to update data set 532 to reflect the proposed changes authorized by data access coordination service 270. Thus, the previous example is not intended to be limiting as to other implementations of access coordination schemes for data sets stored in a centralized data repository that may be accessible to multiple data processing environments.

Figure 6:
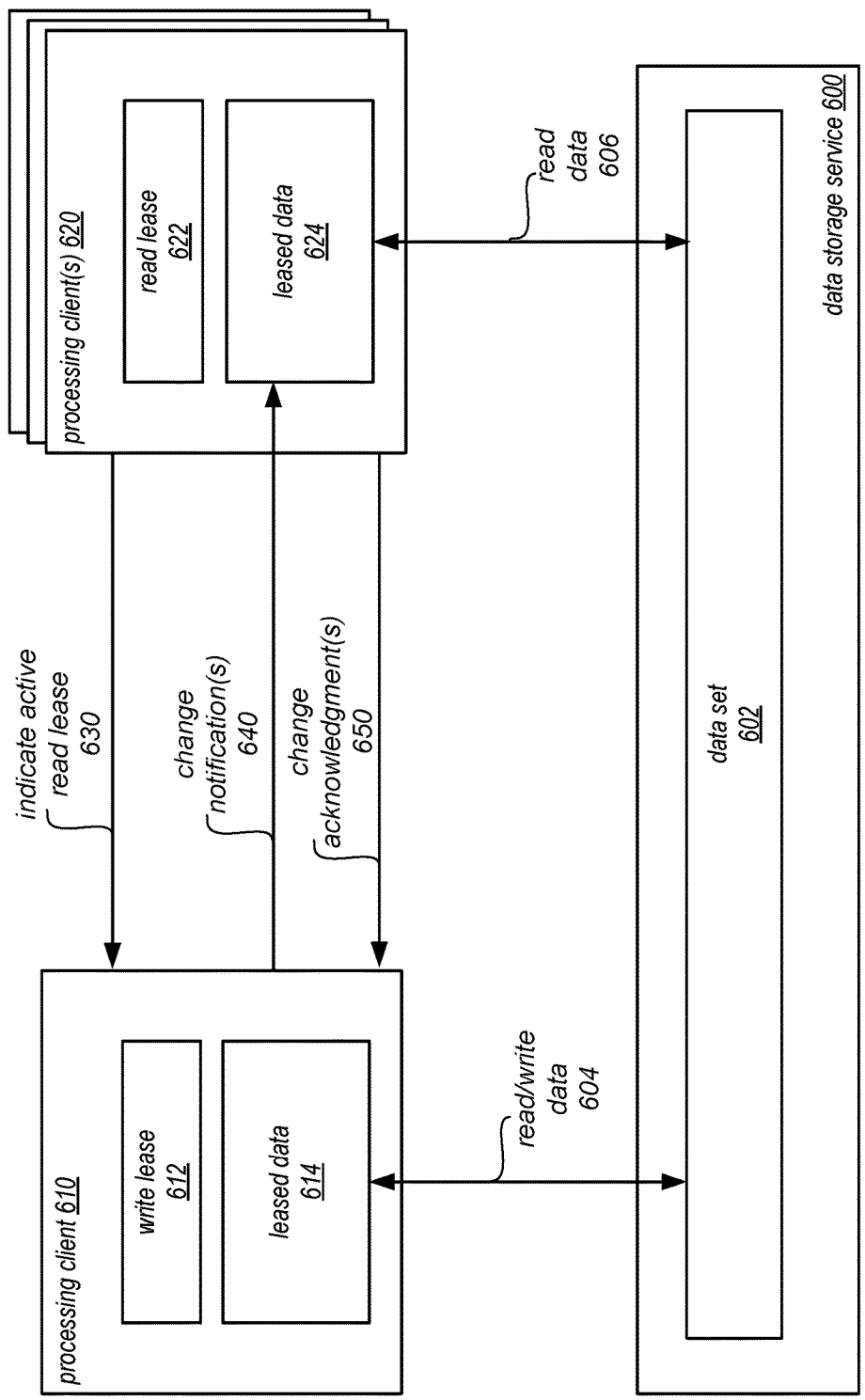
FIG. 6 is a logical block diagram illustrating interactions between multiple processing clients accessing same data stored in a centralized data store, according to some embodiments.

Because multiple processing environments may be able to access the same data set, conflicts or dependencies across separate processing environments may occur. In order to allow for multiple processing environments to continue accessing the data set conflict resolution techniques may be implemented. In one common conflict scenario, a data processor with write access is operating upon the same data that is being read by another data processor with read access. FIG. 6 is a logical block diagram illustrating interactions between multiple processing clients accessing same data stored in a centralized data store, according to some embodiments.

Processing client 610 may hold a valid write lease 612 for performing reads and/or writes 604 to data set 602 stored in data storage service 600. As noted above, processing client 614 may obtain a portion or all of the data to which write lease 612 entitles client 610 to for local operation as leased data 614. Similarly, processing client(s) 620 may have obtained a read lease 622 to perform read operations 606 with respect to data set 602 in data storage service 600. Moreover, processing client(s) 620 may also have obtained a portion or some of the data set 602 for local operation to be maintained as leased data 624.

Because the leases 612 and 622 may grant processing client 610 to change data that overlaps with the data leased to processing client(s) 620 to read various techniques may be implemented to provide indications of changes made by processing client 610 to processing client(s) 620 which may affect the leased data 624 processed by processing client(s) 620. For example, processing client(s) 630 may register or send a notification of an active read lease 630 to processing client 610. Processing client 610 may track active read leases so that when a change to leased data 614 is performed, a corresponding change notification 640 describing the change may be sent to processing client 620. Processing client(s) 620 may then apply the change (or discard the change if it is desirable to operate upon a past view or snapshot of the data that has already been obtained as leased data 624). Processing client(s) may then send a corresponding change acknowledgement 650 to indicate that the change has been received at processing client(s) 620. Once received acknowledgement(s) are received for the change from processing client(s) 620, the processing client may identify the change for update in the authoritative version maintained in data set 602 (e.g., by marking older versions in leased data 614 or data set 602 as reclaimable, garbage collectible, or otherwise no longer needing to be maintained). Note that the illustrated interactions in FIG. 6 may not be implemented "out-of-the-box" in standard implementations of various data processing environments. Instead of reconfiguring these standard implementations, in some embodiments, data access coordination service 270 or another component of provider network 200 may provide lease management agents or other mechanisms that can be installed or executed alongside existing data processing environments so that no major changes to the code or execution of the data processing environments need be implemented (although minor changes to install or add in the agent may be required).

Figure 7:
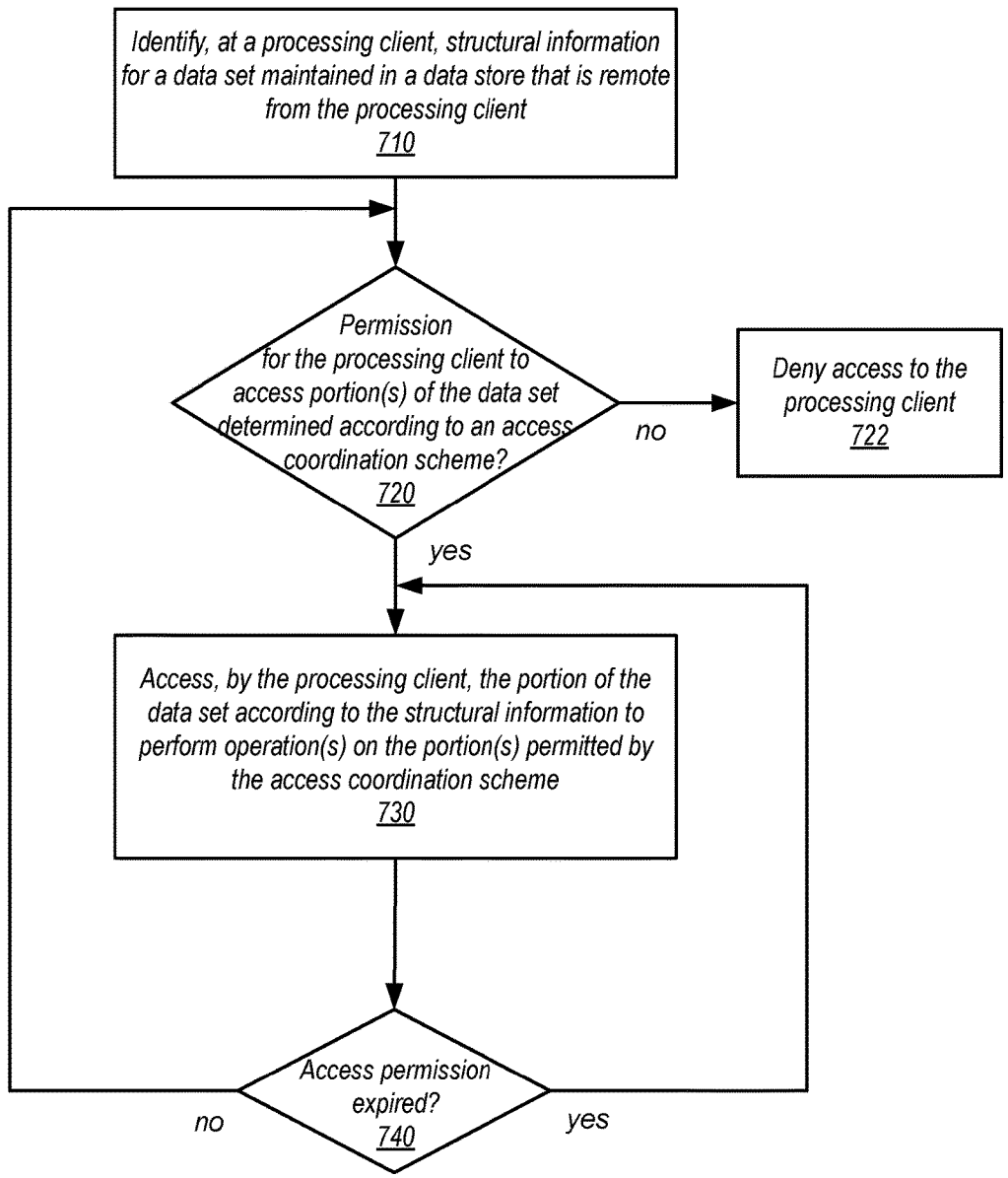
FIG. 7 is a high-level flowchart illustrating methods and techniques to implement accessing data in a centralized data store for multiple data processing environments, according to some embodiments.

Although FIGS. 2-6 have been described and illustrated in the context of a provider network leveraging multiple different services for accessing data in a centralized data store, the various components illustrated and described in FIGS. 2-6 may be easily applied to other data access or management systems that make data sets accessible to multiple data processing systems, components, or devices. As such, FIGS. 2-6 are not intended to be limiting as to other embodiments of a system that may implement a centralized data store for multiple data processing environments. FIG. 7 Various different systems and devices may implement the various methods and techniques described below, either singly or working together. For example, a data processing service and/or storage service, along with a data catalog service and access coordination service such as described above with regard to FIGS. 2-6 may be configured to implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

Different data sets may be maintained in a centralized data store. Data sets may be any collection of one or more data objects (e.g., data files, tables, databases, etc.) which may be maintained for access. Some of these data sets may be available for access by multiple data processors. To identify which data sets are accessible for multiple data processing environments, authentication and identity management techniques may be implemented to determine which data sets are identified as available for shared access, in some embodiments. For instance, a data set may be marked or identified for access by specific data processing clients or by data processing clients that provide identity credentials that corresponding to an authorized user of the data set.

As indicated at 710, structural information for a data set maintained in a data store that is remote from a processing client may be determined at the processing client, in some embodiments. For example, the data processing client itself may access and evaluate the data set to apply different structure recognition techniques for the data set or may request the structural data from a separate structural data store for the data set, such as a data catalog for the data set generated by the application of structure recognition techniques and maintained for the data set by a data catalog service as discussed above with regard to FIGS. 2 and 3. Structure recognition techniques may be applicable to determine structural data for the data sets. For example, access requests may be sent to retrieve some or all of the data stored in the data set (and/or metadata describing the data set stored in the storage location). In at least some embodiments, the storage locations may be accessed by crawling the storage locations to extract data for performing the structure recognition techniques. The identification of data sets as associated with a user, client, or account may be also be performed when crawling all or a portion of data sets maintained at a storage location.

Structural data may be any data that describes the data set such that another system component or device may access (e.g., read, write, modify, or otherwise interact with) data stored as part of the data set. For example, structural data may be considered metadata or other information that identifies the arrangement or format of data in the storage location (e.g., tabular data format, number of columns, column headers). Structural data may also include data types, such as generic data types (e.g., string, integer, or floating point number) or customized, user/client-specified, or other specially defined data types (e.g., zip codes, uniform resource locator (URL), gender, date, time, jazz audio, etc.). In some embodiments, structural data may include generic file types (e.g., log file, or database table) or specific file types (e.g., JavaScript object notation (JSON), optimized row columnar (ORC), parquet, etc.), data formats (column orient, row-oriented, semi-structured, etc.) or other information describing the data set, such as statistics used to optimize access operations (e.g., min-max values for zone maps, cardinality, and other information used by a query optimizer).

Structure recognition techniques may include various techniques to recognize delimiters between items in a data set (e.g., commas in a CSV file, tabs, etc.). For example, a frequency analysis may identify that a certain, symbol, character or bit pattern occurs between different portions of data, and thus may be the delimiter. Other structure recognition techniques to determine file type or file format (file recognition techniques) may look for data signatures or patterns located within a data set (e.g., version numbers located at particular positions in the file). Data type recognition techniques are another form of structure recognition technique that may be implemented, for example, to identify generic data types (e.g., string, integer, floating point, etc.). Data recognition techniques may also recognizes special data types (e.g., 5 character numbers that are postal codes). Multiple structure recognition techniques may be applied in hierarchical order. For example, file format or file type recognition techniques may be first applied to recognize a file type. Then data format or type recognition techniques may be applied that are commonly found or correspond to the identified file format or type may be applied. In at least some embodiments, the structure recognition techniques be uploaded, edited, and/or selected by a user (e.g., by providing structural data, such as schema information, signatures, patterns, predicates, or other information useful for identifying structural data) and provided to a data processing client or other system that performs data structure recognition (e.g., data catalog service 220 in FIG. 2).

As indicated at 720, permission may (or may not) be obtained for the processing client to access one or more portions (or the entirety) of the data set according to an access coordination scheme, in some embodiments. A leasing scheme, as discussed above with regard to FIGS. 4, 5, and 6, may be implemented, in some embodiments, so that leases may be obtained for individual processing clients granting permission to perform certain operations (possibly within certain time limits). Other access coordination schemes may include role-based access control, identity based access control, distributed lock management, and/or any other access control scheme that may be implemented to adjudicate between the various access permissions that may be granted to multiple data processing clients accessing a same data set (either to same portions of the data set and/or different portions of the data set). For example, conflicting access (e.g., by evaluating proposed operations, changes, or transactions from multiple data processing clients) may be detected so that only a single data processing client is allowed permission to perform operations (e.g., the first to submit changes). If access is not granted, then as indicated at 722, access may be denied to the processing client 722 and no operations may be performed (or operations may be rolled-backed).

As indicated by the positive exit from 720, if permission to access the data set is obtained, then the processing client may access the portion(s) of the data set according to the structural information to perform operation(s) on the portion permitted by the access coordination scheme, as indicated at 730. For example, some operations may be permitted to read, copy, get, or otherwise obtain data (e.g., blocks, pages, objects, chunks, or groups of blocks, pages, objects or chunks) for local processing at processing client (or for direct processing at the remote data store). Similarly, other example operations permitted by the access coordination scheme may include operations to change, modify, update, delete or add data to the data set (e.g., by first obtaining the data set (or portion thereof) and then making the change modification, update, delete or addition and then subsequently storing the update or new data to the remote data store). Permitted operations may be performed by the processing client until access permission is expired, as indicated at 740, (e.g., at the end of a lease term or upon completion of the permitted transaction). Either permission may be obtained again, as indicated by the negative exit from 740 or access may cease for the processing client (not illustrated).

Figure 8:
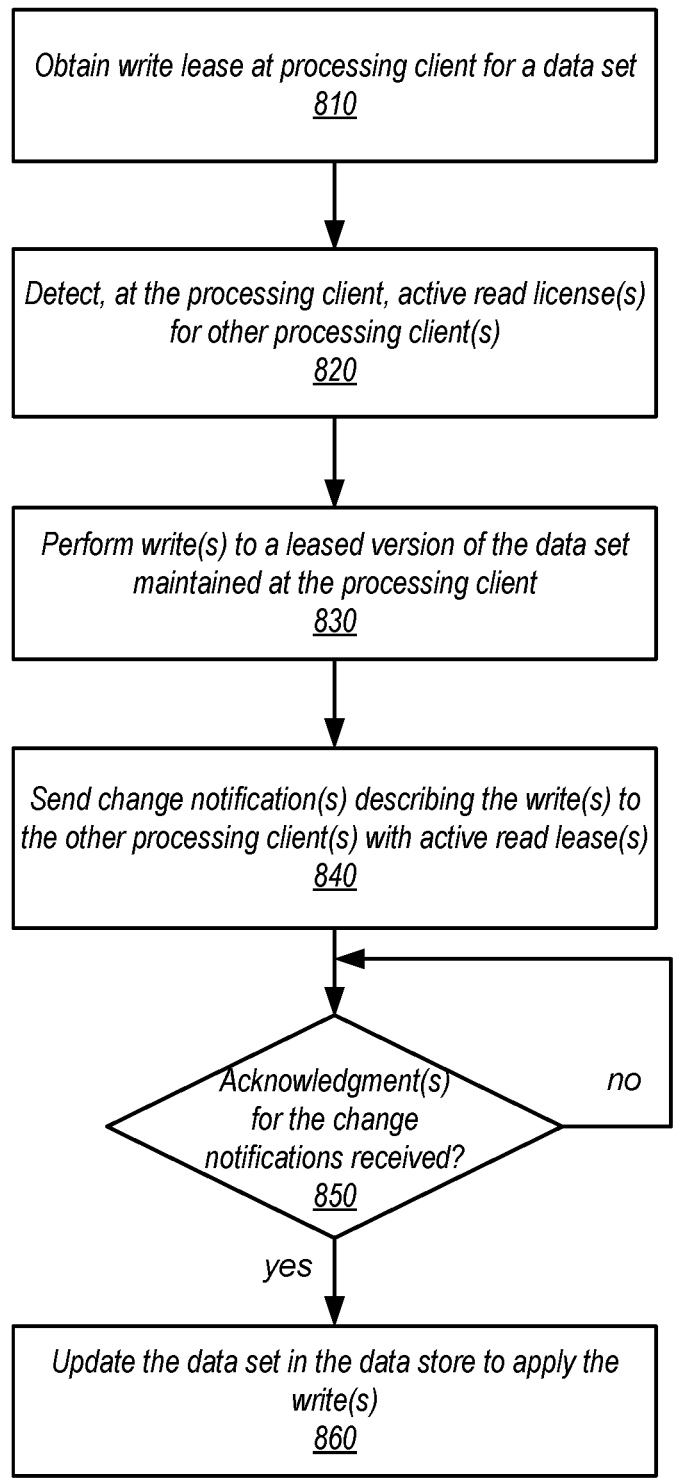
FIG. 8 is a high-level flowchart illustrating methods and techniques to implement interactions between a processing client updating data stored in a centralized data store that is accessed by other processing clients, according to some embodiments.

Allowing accessing to processing clients according to the various techniques described above may allow for multiple data processing clients to access the same data set. In this way the advantages offered by having multiple data processing clients (which may be implemented by different types of query or other processing engines) may applied to the same data set. For example, FIG. 8 is a high-level flowchart illustrating methods and techniques to implement interactions between a processing client updating data stored in a centralized data store that is accessed by other processing clients, according to some embodiments.

As indicated at 810, a data processing client may obtain a write lease for writing to leased portion(s) or the entirety of a data set. The processing client may detect, as indicated at 820, that other read licenses for other data processing client(s) are active for the data set. As indicated at 830, when write(s) or other updates to the leased version of the data set maintained at the processing client are performed, then change notifications(s) describing the write(s) may be sent to other processing client(s) with active read lease(s), as indicated at 840.

If acknowledgements for the change notification(s) are received, as indicated by the positive exit from 860, then the data set in the data store may be updated to apply the write(s), as indicated at 870. In this way, the authoritative version of the data set may not reflect write(s) which might be read by other data processing client(s) until the other data processing client(s) are aware that the changes exist. If acknowledgments are not received, then application of the writes at the data store may be held off until acknowledgments are received (or a timeout for the other processing client(s) expires). Note that a data processing client with a valid write lease may ultimately be able to update the data set in the data store to apply the write(s) even without the acknowledgment of the other data processing client(s). However, a timeout period may provide the other data processing client(s) with a change to become up-to-date (e.g., not stale) in the event the other data processing clients rely upon local versions of the data set maintained at the data processing client(s) which would not be updated when changes are made to the data set in the data store.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
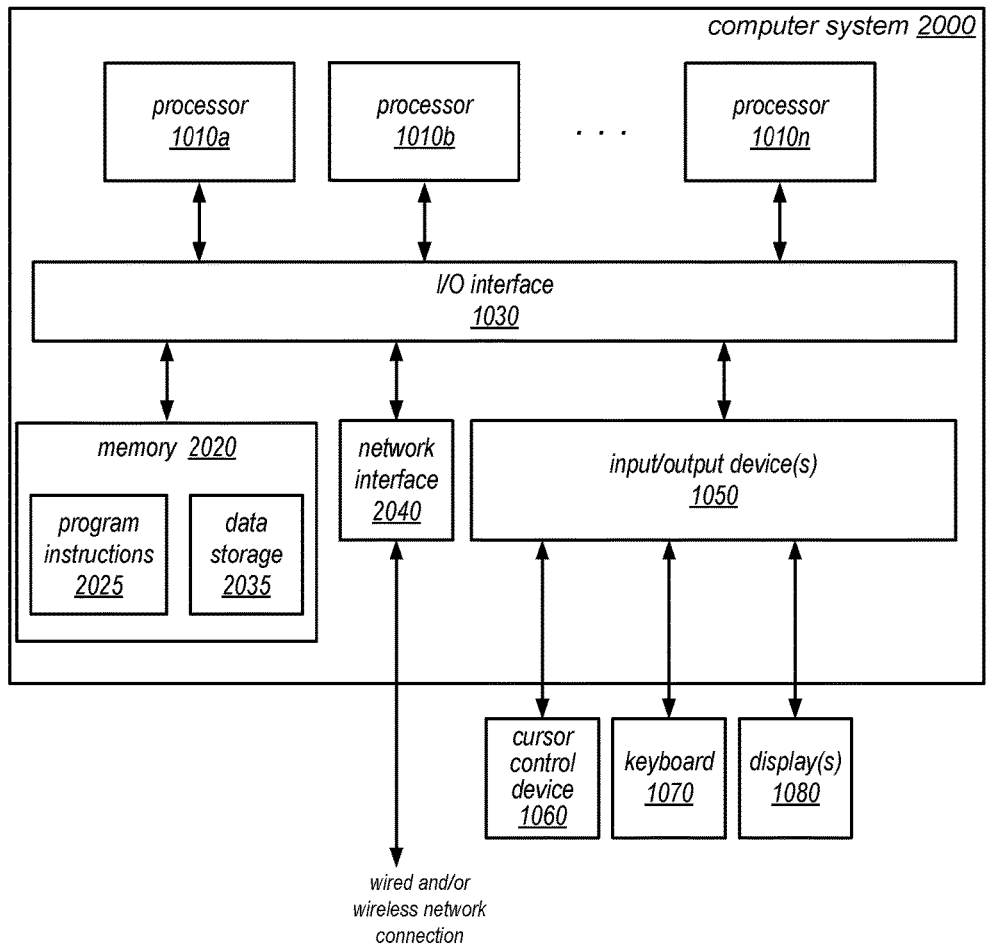
FIG. 9 illustrates an example system configured to implement the various methods, techniques, and systems described herein, according to some embodiments.

Embodiments of a centralized data store providing access to multiple data processing environments as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A provider network, comprising:
a plurality of compute nodes, comprising one or more processors and a memory, configured to implement:
an object data storage service, that maintains a data set;
a data catalog service, that maintains structural data that describes the data set in order to allow a data processor to be capable of recognizing content already stored in the data set when accessing the content stored in the data set;
an access coordination service, that grants permissions to access the data set; and
a plurality of data processors implemented by different ones of a plurality of other services in the provider network; and
one of the data processors, configured to:
request the structural information for the data set from the data catalog service;
obtain a lease from the data access coordination service that grants permission for the data processor to access at least a portion of the content stored in the data set, wherein at least one other of the data processors previously obtained another lease for the data set; and
access the portion of the data set according to the structural information to perform one or more operations on the portion of the content stored in the data set permitted by the lease.

2. The system of claim 1, wherein the data processor implements a different type of query engine than the at least one other data processor that previously obtained the other lease for the data set.

3. The system of claim 1, wherein to access the portion of the content stored in the data set according to the structural information, the data processor is configured to:
obtain at least some of the portion of the data set from the object data storage service to be maintained at the data processor, wherein the one or more operations are performed upon the at least some portion of the data set maintained at the data processor.

4. The system of claim 1, wherein the lease obtained from the data access coordination service is a lease that grants the data processor permission to perform writes with respect to the portion of the content stored in the data set, wherein the other lease for the at least one other data processor grants the at least one other data processor permission to perform reads with respect to the portion of the content stored in the data set, and wherein the data processor is further configured to:
send a corresponding change notification to the at least one other data processor that describes a write performed as part of the one or more operations; and
upon receipt of an acknowledgement of the change notification from the at least one other data processor, update the object data store to apply the write performed as part of the one or more operations.

5. A method, comprising:
performing, by one or more computing devices:
identifying, at a processing client, structural information that describes a data set in order to allow the processing client to be capable of recognizing content already stored in the data set when accessing the data set, the data set maintained in a data store that is remote to the processing client;
determining permission for the processing client to access at least a portion of the content stored in the data set according to an access coordination scheme for the data set, wherein one or more different processing clients have access to the data set according to the access coordination scheme; and
accessing, by the processing client, the portion of the content stored in the data set according to the structural information to perform one or more operations on the portion of the content stored in the data set permitted by the access coordination scheme for the data set.

6. The method of claim 5, wherein the one or more operations permitted by the access coordination scheme comprise a read performed with respect to the portion of the content stored in the data set.

7. The method of claim 6, wherein the access coordination scheme grants access to the different processing clients for a same portion of the content stored in the data set as the portion of the content stored in the data set accessed by the processing client.

8. The method of claim 7, wherein one of the different processing clients have write access permissions with respect to the portion of the content stored in the data set, and wherein the method further comprises:
receiving, from the one different data processing client, a notification describing the write performed with respect to the portion of the content stored in the data set;
updating, at least some of the portion of the content stored in the data set maintained at the processing client according to the described write; and
sending an acknowledgment of the notification to the one different data processing client.

9. The method of claim 5, wherein the access coordination scheme grants the different processing clients access to a different portion of the content stored in the data set than the portion of the data set accessed by the processing client.

10. The method of claim 5, wherein determining permission for the processing client to access the portion of the content stored in the data set comprises requesting a lease to access the portion of the data set.

11. The method of claim 5, wherein determining permission for the processing client to access the portion of the content stored in the data set comprises validating that the one or more operations to be performed by the processing client do not conflict with one or more other operations performed by at least one of the different processing clients with respect to the portion of the data set.

12. The method of claim 5, wherein accessing the portion of the content stored in the data set according to the structural information to perform the one or more operations comprises obtaining at least some of the portion of the content stored in the data set from the remote data store to be maintained at the processing client, wherein the one or more operations are performed upon the at least some portion of the content stored in the data set maintained at the processing client.

13. The method of claim 5, wherein the remote data store is a network-based service, wherein the processing client and the different processing clients are implemented as part of other network-based services, and wherein determining the structural data for the comprises requesting the structural data from a data catalog service that generated the structural data for the data set.

14. A non-transitory, computer-readable storage medium, storing program instructions that when executed by one or more computing devices cause the one or more computing devices to implement:
   obtaining, at a processing client, structural information that describes a data set in order to allow the processing client to be capable of recognizing content already stored in the data set when accessing the data set, the data set maintained in a data store that is remote to the processing client;
   determining permission for the processing client to access at least a portion of the content stored in the data set according to perform one or more operations with respect to the data set according to an access coordination scheme for the data set, wherein one or more different processing clients have access to the data set according to the access coordination scheme; and
   accessing, by the processing client, the portion of the content stored in the data set according to the structural information to perform one or more operations on the portion of the content stored in the data set permitted by the access coordination scheme for the data set.

15. The non-transitory, computer-readable storage medium of claim 14, wherein the one or more operations permitted by the access coordination scheme comprise a write performed with respect to the portion of the content stored in the data set.

16. The non-transitory, computer-readable storage medium of claim 15, wherein, in accessing the portion of the content stored in the data set according to the structural information to perform the one or more operations on the portion of the content stored in the data set, the program instructions cause the one or more computing devices to implement:
   sending a corresponding change notification to at least one of the different processing clients that describes the write performed as part of the one or more operations; and
   upon receiving of an acknowledgement of the change notification from the at least one other processing client, updating the data set in the remote store to apply the write performed as part of the one or more operations.

17. The non-transitory, computer-readable storage medium of claim 14, wherein the different processing clients have access to a different portion of the content stored in the data set than the portion of the data set accessed by the processing client.

18. The non-transitory, computer-readable storage medium of claim 14, wherein, in accessing the portion of the content stored in the data set according to the structural information to perform the one or more operations on the portion of the content stored in the data set, the program instructions cause the one or more computing devices to implement:
   obtaining at least some of the portion of the content stored in the data set from the remote data store to be maintained at the processing client, wherein the one or more operations are performed upon the at least some portion of the content stored in the data set maintained at the processing client.

19. The non-transitory, computer-readable storage medium of claim 14, wherein the processing client implements a different type of processing environment than another processing environment implemented by at least one of the different processing clients that previously obtained permission for the data set.

20. The non-transitory, computer-readable storage medium of claim 14, wherein the remote data store is a network-based service, wherein accessing the portion of the content stored in the data set access the portion of the data set via a network-based interface for the network-based service, and wherein the processing client and the different processing clients are implemented as part of one or more other network-based services.

* * * * *